(12) United States Patent
Tang et al.

(10) Patent No.: US 9,172,527 B2
(45) Date of Patent: Oct. 27, 2015

(54) SIGNAL PROCESSING METHOD AND APPARATUS

(71) Applicant: Huawei Technologies Co., Ltd., Shenzhen (CN)

(72) Inventors: Tian Tang, Nanjing (CN); Shenghua Niu, Nanjing (CN); Lebin Tang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 14/562,231

(22) Filed: Dec. 5, 2014

(65) Prior Publication Data

US 2015/0172041 A1    Jun. 18, 2015

(30) Foreign Application Priority Data

Dec. 12, 2013   (CN) .......................... 2013 1 0684694

(51) Int. Cl.
| | | |
|---|---|---|
| H04L 27/00 | (2006.01) | |
| H04L 7/06 | (2006.01) | |
| G06F 13/40 | (2006.01) | |
| H04L 7/00 | (2006.01) | |
| H04L 7/04 | (2006.01) | |

(52) U.S. Cl.
CPC .............. *H04L 7/06* (2013.01); *G06F 13/4072* (2013.01); *H04L 7/0087* (2013.01); *H04L 7/0091* (2013.01); *H04L 7/04* (2013.01)

(58) Field of Classification Search
CPC ....... H04L 7/06; H04L 7/0087; H04L 7/0091; H04L 7/04
See application file for complete search history.

(56) References Cited

U.S. PATENT DOCUMENTS

| | | | | |
|---|---|---|---|---|
| 5,809,255 | A  * | 9/1998 | Amada et al. ................. | 709/248 |
| 5,931,927 | A   | 8/1999 | Takashima | |
| 6,614,424 | B1 * | 9/2003 | Kim et al. ...................... | 345/213 |
| 7,555,038 | B2 * | 6/2009 | Watanabe et al. ............. | 375/224 |
| 2001/0052097 | A1 * | 12/2001 | Miura ........................... | 714/744 |
| 2004/0225945 | A1 | 11/2004 | Poechmueller | |
| 2005/0108468 | A1 | 5/2005 | Hazelzet et al. | |
| 2009/0262875 | A1 * | 10/2009 | Arai .............................. | 375/373 |
| 2010/0309737 | A1 * | 12/2010 | Cheng .......................... | 365/193 |
| 2012/0268173 | A1 | 10/2012 | Nishio et al. | |
| 2014/0233084 | A1 * | 8/2014 | Ono et al. ..................... | 359/279 |

OTHER PUBLICATIONS

Foreign Communication From a Counterpart Application, European Application No. 14195711.8, Extended European Search Report dated Feb. 27, 2015, 6 pages.

* cited by examiner

*Primary Examiner* — Erin File
(74) *Attorney, Agent, or Firm* — Conley Rose P.C.; Grant Rodolph

(57) ABSTRACT

A signal processing method and apparatus. According to the signal processing method, phase change processing can be performed on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing a volume of coupling crosstalk, generated by the to-be-sent data signals, on the data synchronization signal and further reducing impact of simultaneously switching noise (SSN) on a system.

18 Claims, 4 Drawing Sheets

SIGNAL PROCESSING METHOD AND APPARATUS

CROSS-REFERENCE TO RELATED APPLICATION

This application claims priority to Chinese Patent Application No. 201310684694.0, filed on Dec. 12, 2013, which is hereby incorporated by reference in its entirety.

TECHNICAL FIELD

The present invention relates to the field of communications technologies, in particular, to a signal processing method and apparatus.

BACKGROUND

A double data rate (DDR) synchronous dynamic random access memory (SDRAM) is a currently most common and universal memory, and may be hereinafter referred to as DDR. Because the DDR has a double data rate function, the DDR currently has been widely applied to electronic devices of all industries.

With the rapid development of hardware and network technologies, a user also has an increasingly higher requirement for encapsulation and integration of a DDR chip and a controller chip. Therefore, in a process of exchanging data between the DDR chip and the controller chip, simultaneously switching noise (SSN) is generated during signal transmission, thereby affecting reliability of a DDR interface.

In the prior art, to reduce impact of SSN on reliability of a DDR interface, usually inductive coupling crosstalk between signals is suppressed, which is implemented by decreasing an input/output (I/O) drive current and by increasing, in a case in which an I/O quantity is unchanged, power source and ground pins of a chip. Although this method can decrease some SSN, effect of decreasing SSN is not obvious. Moreover, increasing power source and ground pins of a chip directly increases a difficulty of board design and production; and decreasing an I/O drive current may also affect a rate of a signal edge, thereby affecting a signal sequence.

SUMMARY

In view of this, the present invention provides a signal processing method and apparatus, so as to overcome a problem in the prior art that effect of decreasing SSN is not obvious and it is difficult to design and produce a board.

To achieve the foregoing objectives, the present invention provides the following technical solutions.

According to a first aspect, this application discloses a signal processing method. The signal processing method is applied to a signal transmit end and includes determining a phase status of a data synchronization signal and phase statuses of N to-be-sent data signals, where N is a positive integer; determining a phase difference between each to-be-sent data signal and the data synchronization signal; performing phase change processing on all or some of the to-be-sent data signals according to a result of the determining; and sending all the to-be-sent data signals and a phase change indication signal to a signal receive end.

In a first possible implementation manner of the first aspect, the performing phase change processing on all or some of the to-be-sent data signals according to a result of the determining includes when phase differences between more than half of the to-be-sent data signals and the data synchronization signal fall within a preset range, performing polarity reversal on all the to-be-sent data signals; or performing polarity reversal on a to-be-sent data signal, where a phase difference between the to-be-sent data signal and the data synchronization signal falls within a preset range.

In a second possible implementation manner of the first aspect, the performing phase change processing on all or some of the to-be-sent data signals according to a result of the determining includes according to a preset algorithm, performing polarity reversal on X to-be-sent data signals in the to-be-sent data signals, where phase differences between the to-be-sent data signals and the data synchronization signal fall within a preset range, and on Y to-be-sent data signals in the to-be-sent data signals, where phase differences between the to-be-sent data signals and the data synchronization signal fall outside the preset range; where X is a positive integer and Y is a natural number.

In a third possible implementation manner of the first aspect, the method further includes adding configuration information in a configuration register of the signal transmit end, wherein the configuration information is used for indicating whether the signal transmit end enables processing a to-be-sent data signal.

In a fourth possible implementation manner of the first aspect, the method further includes transferring the phase change indication signal, using a signal indication line added between the signal transmit end and the signal receive end, or reusing an original signal line between the signal transmit end and the signal receive end.

According to a second aspect, this application discloses another signal processing method. The signal processing method is applied to a signal receive end and includes receiving a phase change indication signal and data signals that are sent by a signal transmit end; and if the phase change indication signal indicates that the signal transmit end has performed phase change processing on the data signals, performing phase restoration processing on the data signals.

In a first possible implementation manner of the second aspect, the performing phase restoration processing on the data signal includes performing polarity reversal on all data signals according to indication information in the phase change indication signal; or performing, according to indication information in the phase change indication signal, polarity reversal on some of the data signals that undergo polarity reversal processing on the signal transmit end.

According to a third aspect, this application discloses a signal processing apparatus. The signal processing apparatus is applied to a signal transmit end and includes a status determining module configured to determine a phase status of a data synchronization signal and phase statuses of N to-be-sent data signals, where N is a positive integer; a phase difference determining module configured to determine a phase difference between each to-be-sent data signal and the data synchronization signal; a signal processing module configured to perform phase change processing on all or some of the to-be-sent data signals according to a result determined by the phase difference determining module; and a signal sending module configured to send all the to-be-sent data signals and a phase change indication signal to a signal receive end.

In a first possible implementation manner of the third aspect, the signal processing module is configured to, when the phase difference determining module obtains, by determining, that phase differences between more than half of the to-be-sent data signals and the data synchronization signal fall within a preset range, perform polarity reversal on all the to-be-sent data signals; or perform polarity reversal on a to-be-sent data signal according to the result of the determining of the phase determining module, where a phase difference between the to-be-sent data signal and the data synchronization signal falls within a preset range.

In a second possible implementation manner of the third aspect, the signal processing module is configured to, according to a preset algorithm, perform polarity reversal on X to-be-sent data signals in the to-be-sent data signals, where phase differences between the to-be-sent data signals and the data synchronization signal fall within a preset range, and on Y to-be-sent data signals in the to-be-sent data signals, where phase differences between the to-be-sent data signals and the data synchronization signal fall outside the preset range; where X is a positive integer and Y is a natural number.

In a third possible implementation manner of the third aspect, the apparatus is configured to add configure information in a configuration register of the signal transmit end, wherein the configuration information is used for indicating whether the signal transmit end enables processing a to-be-sent data signal.

In a fourth possible implementation manner of the third aspect, the apparatus is configured to transfer the phase change indication signal, using a signal indication line added between the signal transmit end and the signal receive end, or reusing an original signal line between the signal transmit end and the signal receive end.

According to a fourth aspect, this application provides another signal processing apparatus. The signal processing apparatus is applied to a signal receive end and includes a signal receiving module configured to receive a phase change indication signal and data signals that are sent by a signal transmit end; and a restoration processing module configured to, when the phase change indication signal indicates that the signal transmit end has performed phase change processing on the data signals, perform phase restoration processing on the data signals.

In a first possible implementation manner of the fourth aspect, the restoration processing module is configured to perform polarity reversal on all data signals according to indication information in the phase change indication signal; or perform, according to indication information in the indication signal, polarity reversal on some of the data signals that undergo polarity reversal processing on the signal transmit end.

It can be learned from the foregoing technical solutions that, compared with the prior art, embodiments of the present invention disclose a signal processing method, and apparatus. According to the signal processing method, phase change processing can be performed on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing, from a source, a volume of coupling crosstalk, generated by the to-be-sent data signals, on the data synchronization signal, reducing interference of the to-be-sent data signals to the data synchronization signal, and further reducing impact of SSN on a system. In the method and apparatus provided by embodiments of the present invention, phase change processing is directly performed on a to-be-sent data signal according to a phase status of a data synchronization signal and a phase status of the to-be-sent data signal to reduce an amplitude value of SSN from an SSN generating source, so that effect of decreasing SSN is obvious, without increasing a difficulty of board design and affecting normal transmission of a signal.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely the embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all embodiments of the present invention. All other embodiments obtained by a person of ordinary skill in the art based on the embodiments of the present invention without creative efforts shall fall within the protection scope of the present invention.

Figure 1:
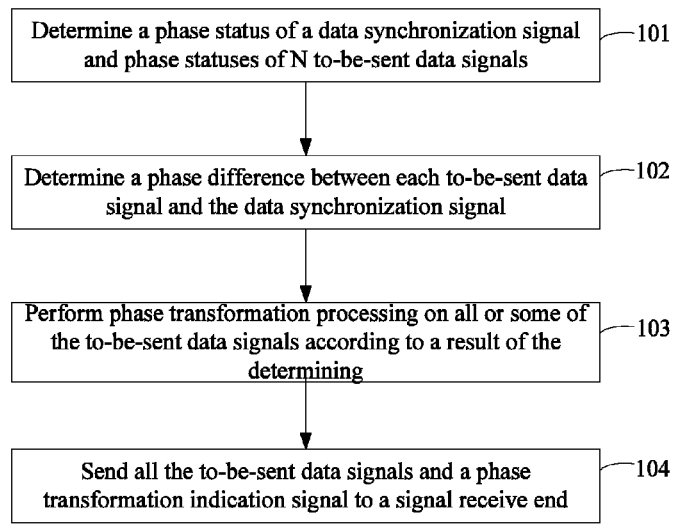
FIG. 1 is a flowchart of a signal processing method according to an embodiment of the present invention.

FIG. 1 is a flowchart of a signal processing method according to an embodiment of the present invention. The signal processing method is applied to a signal transmit end. As shown in FIG. 1, the method may include the following steps:

Step 101: Determine a phase status of a data synchronization signal and phase statuses of N to-be-sent data signals.

N is a positive integer and the to-be-sent data signals may include one or a plurality of to-be-sent data signals. The plurality of to-be-sent data signals described herein is a plurality of to-be-sent data signals that may be simultaneously sent using different transmission paths.

Figure 2:
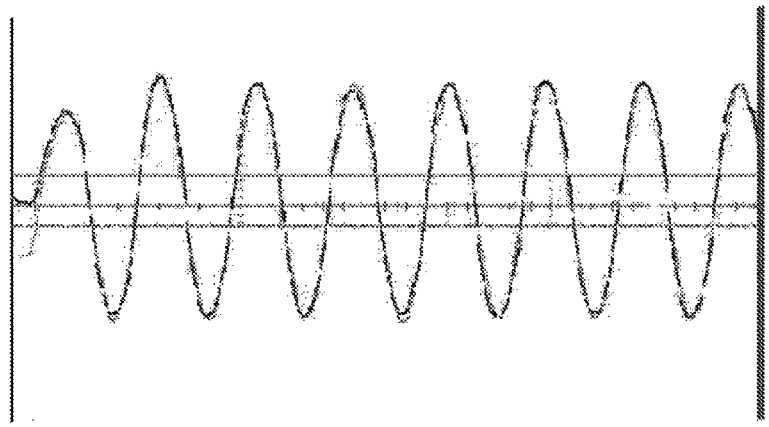
FIG. 2 is a diagram of a signal waveform when a phase difference between a data synchronization signal and a to-be-sent data signal is an integer multiple of 360° (degrees)
Figure 3:
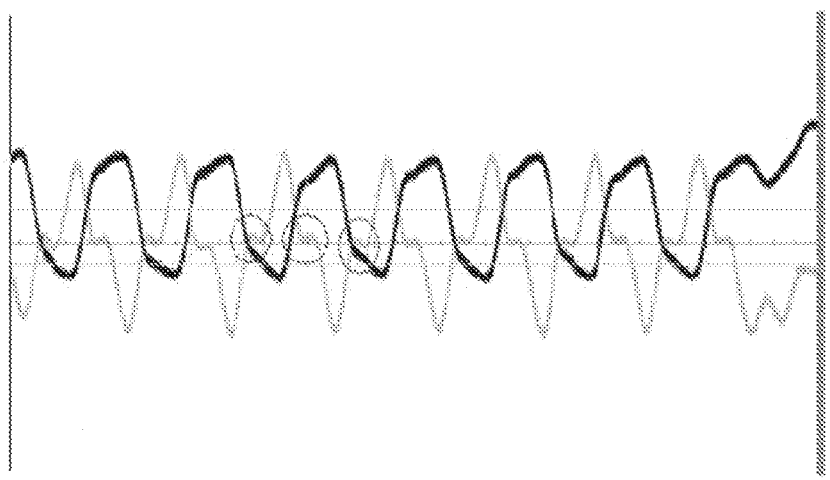
FIG. 3 is a diagram of a signal waveform when a phase difference between a data synchronization signal and a to-be-sent data signal is an odd multiple of 180°.

When a data synchronization signal and a to-be-sent data signal are sent simultaneously, the to-be-sent data signal may generate interference to the data synchronization signal, where main interference is SSN. For ease of understanding, refer to FIG. 2 and FIG. 3. FIG. 2 is a diagram of a signal waveform when a phase difference between the data synchronization signal and the to-be-sent data signal is an integer multiple of 360°. FIG. 3 is a diagram of a signal waveform when a phase difference between the data synchronization signal and the to-be-sent data signal is an odd multiple of 180°. In FIG. 2, a gray line is a data synchronization signal line and a black line is a to-be-sent data signal line. The data synchronization signal line and the to-be-sent data signal have a same phase, and the two signal lines basically overlap. A data synchronization signal is basically not interfered by a to-be-sent data signal. Whereas in FIG. 3, a gray line is a data synchronization signal line and a black line is a to-be-sent data signal line. In this case, a phase of the data synchronization signal line is opposite to a phase of the to-be-sent data signal line. When a drive current of the to-be-sent data signal is at a maximum, that is, when the black line representing the to-be-sent data signal in FIG. 3 is in a middle position, the data synchronization signal is affected by a reverse-direction drive current of the to-be-sent data signal, and a step/back is formed. For details, refer to positions indicated by circles in FIG. 3.

It can be learned from the foregoing description that a to-be-sent data signal generates relatively strong interference to a data synchronization signal when a phase of the to-be-sent data signal is opposite or nearly opposite to a phase of the data synchronization signal, especially when a drive current direction of the to-be-sent data signal is opposite to a drive current direction of the data synchronization signal and a drive current of the to-be-sent data signal reaches a maximum value. Therefore, in step 101, when the signal transmit end sends to-be-sent data signals, a phase status of a data synchronization signal and phase statuses of the to-be-sent data signals may be first determined. Then, corresponding processing may be performed on a to-be-sent data signal that generates relatively strong interference to the data synchronization signal, so as to achieve a purpose of reducing interference generated by the to-be-sent data signal to the data synchronization signal.

Step 102: Determine a phase difference between each to-be-sent data signal and the data synchronization signal.

After the phase status of the data synchronization signal and the phase statuses of the to-be-sent data signals are determined in step 101, if it is found that all to-be-sent data signals currently generate relatively strong interference to the data synchronization signal on the whole, some processing needs to be performed on the to-be-sent data signals, so as to greatly reduce interference of the processed to-be-sent data signals to the data synchronization signal.

It has been analyzed above that, when the to-be-sent data signal and the data synchronization signal have a same phase, the to-be-sent data signal basically does not generate obvious interference to the data synchronization signal; whereas when the phase of the to-be-sent data signal is opposite or nearly opposite to the phase of the data synchronization signal, the to-be-sent data signal generates very strong interference to the data synchronization signal. Therefore, it may be determined, according to the phase difference between the to-be-sent data signal and the data synchronization signal, whether the phase status of the to-be-sent data signal and the phase status of the data synchronization signal are closer to be same phase or closer to be opposite phases.

Step 103: Perform phase change processing on all or some of the to-be-sent data signals according to a result of the determining.

How to perform phase change on a to-be-sent data signal may be preconfigured according to different user requirements. For example, it may be configured to perform first presetting processing when the result of the determining in step 102 meets a first preset condition; and perform second presetting processing when the result of the determining in step 102 meets a second preset condition.

Step 104: Send all the to-be-sent data signals and a phase change indication signal to a signal receive end.

Because the signal transmit end has performed related processing on a to-be-sent data signal, the to-be-sent data signal subsequently received by the signal receive end is the to-be-sent data signal processed by the signal transmit end and is not an original to-be-sent data signal. In order not to affect subsequent processing of the signal receive end, the signal transmit end needs to send, to the signal receive end, the phase change indication signal indicating phase change processing performed on the to-be-sent data signal, so that the signal receive end learns the processing that the signal transmit end performs on the to-be-sent data signal, and performs subsequent work according to the original to-be-sent data signal that is restored.

To implement the foregoing technical solution, configuration information may be added in a configuration register of the signal transmit end. The configuration information is used for indicating whether the signal transmit end enables processing a to-be-sent data signal. A signal indication line may also be added between the signal transmit end and the signal receive end, or an original signal line between the signal transmit end and the signal receive end is reused. The phase change indication signal is transferred using the original signal line or the signal indication line, so that the signal receive end learns in real-time a status of a function that the signal transmit end enables processing on a to-be-sent data signal. For example, if the signal transmit end is a DDR and the signal receive end is a controller, one pin may be correspondingly added between the DDR and the controller, or a data mask (DM) pin is reused, so as to implement information indicating whether a function that the DDR processes a to-be-sent data signal is applied.

In this embodiment, according to the signal processing method, phase change processing can be performed on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing interference of the to-be-sent data signals to the data synchronization signal and further decreasing SSN. According to the method, phase change processing is directly performed on a to-be-sent data signal according to a phase status of a data synchronization signal and a phase status of the to-be-sent data signal to reduce an amplitude value of SSN from an SSN generating source, so that effect of decreasing SSN is obvious, without increasing a difficulty of board design and affecting normal transmission of a signal.

In the foregoing embodiment, step 103 may be implemented in a different manner. For example, when phase differences between more than half of the to-be-sent data signals and the data synchronization signal fall within a preset range, polarity reversal is performed on all the to-be-sent data signals. Alternatively, polarity reversal is performed on a to-be-sent data signal, where a phase difference between the to-be-sent data signal and the data synchronization signal falls within a preset range. Alternatively, according to a preset algorithm, polarity reversal is performed on X to-be-sent data signals in the to-be-sent data signals, where phase differences between the X to-be-sent data signals and the data synchronization signal fall within a preset range, and on Y to-be-sent data signals in the to-be-sent data signals, where phase differences between the Y to-be-sent data signals and the data synchronization signal fall outside the preset range; where X is a positive integer and Y is a natural number.

The preset range may be a phase difference range in a case in which a phase of a to-be-sent data signal is opposite and nearly opposite to a phase of a data synchronization signal.

In a scenario in which a requirement on SSN is not strict, if the phase differences between more than half of the to-be-sent data signals and the data synchronization signal fall within the preset range, it indicates that most to-be-sent data signals in all the to-be-sent data signals generate relatively strong SSN interference to the data synchronization signal. Therefore, if polarity reversal processing is performed on all the to-be-sent data signals, most to-be-sent data signals in all the processed to-be-sent data signals do not generate obvious interference to the data synchronization signal, thereby decreasing SSN in a system.

In still some cases, the signal transmit end performs polarity reversal processing on a to-be-sent data signal according to a fixed algorithm that is preset. For example, when it is determined that, in all to-be-sent data signals, there are N to-be-sent data signals meeting a condition that phases of the N to-be-sent data signals are opposite to a phase of the data synchronization signal, according to the preset algorithm, it is finally determined that polarity reversal processing is performed on a few to-be-sent data signals in the N to-be-sent data signals, or it is finally determined that polarity reversal processing is performed on a few to-be-sent data signals in the N to-be-sent data signals and a few other to-be-sent data signals (herein, the to-be-sent data signals may have a same phase as the data synchronization signal) excluded in the N to-be-sent data signals. Certainly, regardless of what algorithm is used or regardless of whether phases of to-be-sent data signals on which polarity reversal processing is finally performed are opposite to the phase of the data synchronization signal, it is only required to ensure that a majority of all the to-be-sent data signals do not generate relatively strong interference to the data synchronization signal after phase processing is performed, and a value of interference generated, after phase processing is performed, by all the to-be-sent data signals to the data synchronization signal is less than a value of interference generated, before processing is performed, by all the to-be-sent data signals to the data synchronization signal.

In a scenario in which a requirement on SSN is relatively strict, if only a few phase differences between all to-be-sent data signals and the data synchronization signal fall within the preset range, it indicates that only a few to-be-sent data signals in all to-be-sent data signals generate relatively strong interference to the data synchronization signal. Therefore, polarity reversal may be performed specially on the to-be-sent data signals, where the phase differences between the to-be-sent data signals and the data synchronization signal fall within the preset range, so as to decrease SSN in a system. Certainly, after performing polarity reversal processing on some to-be-sent data signals in all the to-be-sent data signals, the signal transmit end records the to-be-sent data signals on which polarity reversal processing is performed and sends a corresponding phase change indication signal to the signal receive end, where the phase change indication signal may indicate which signals on which phase change processing is performed by the signal transmit end. Therefore, after receiving data signals, the signal receive end can conveniently identify the data signals that undergo phase change processing and data signals that do not undergo phase change processing.

According to the signal processing method, phase change processing can be performed on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing a volume of coupling crosstalk, generated by the to-be-sent data signals, on the data synchronization signal and further decreasing impact of SSN on a system.

Figure 4:
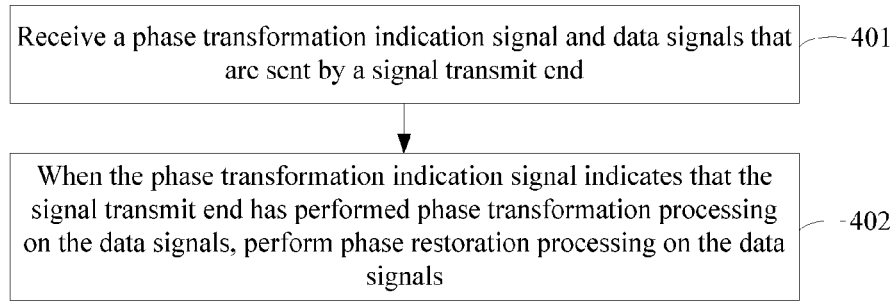
FIG. 4 is a flowchart of another signal processing method according to an embodiment of the present invention.

FIG. 4 is a flowchart of another signal processing method according to an embodiment of the present invention. The signal processing method is applied to a signal receive end. As shown in FIG. 4, the signal processing method may include the following steps:

Step 401: Receive a phase change indication signal and data signals that are sent by a signal transmit end.

The phase change indication signal is used for indicating phase change processing that the signal transmit end performs on the data signals. The phase change processing may be phase change processing that the signal transmit end performs on the data signals to decrease SSN in a signal transfer process.

If the signal receive end receives the phase change indication signal sent by the signal transmit end, received data signals are the data signals that undergoes phase change processing performed by the signal transmit end.

Step 402: If the phase change indication signal indicates that the signal transmit end has performed phase change processing on the data signals, perform phase restoration processing on the data signals.

The data signals received by the signal receive end are the data signals that undergoes phase change processing performed by the signal transmit end, and are not original data signals. Therefore, to ensure that subsequent work is performed accurately and smoothly, phase restoration processing needs to be first performed on the received data signals according to the phase change indication signal received from the signal transmit end.

In this embodiment, a signal receive end may receive a phase change indication signal sent by a signal transmit end, where the phase change indication signal may be a signal indicating phase change processing that the signal transmit end performs on a data signal. The phase change processing can enable phase differences between a majority of data signals in processed to-be-sent data signals and a data synchronization signal to meet a certain condition, thereby reducing a volume of coupling crosstalk, generated by the to-be-sent data signals, on the data synchronization signal and further reducing impact of SSN on a system. Therefore, after receiving data signals sent by the signal transmit end, the signal receive end can restore the data signals into original data signals according to processing that the signal transmit end previously performs on the data signals, that is, performs phase restoration processing on the received data signals. In this way, SSN in a signal transmission process is reduced and the original data signals can be also acquired, without affecting normal work subsequently performed according to the data signals.

In the foregoing embodiment, step 402 may be implemented in a different manner. For example, polarity reversal is performed on all data signals according to indication information in the phase change indication signal. Alternatively, according to indication information in the phase change indication signal, polarity reversal is performed on some of the data signals that undergo polarity reversal processing on the signal transmit end.

It should be noted that the signal receive end performs phase restoration processing on the data signals according to the phase change indication signal that is sent by the signal transmit end and is received by the signal receive end. If the phase change indication signal indicates that the signal transmit end has performed polarity reversal on all data signals when sending data signals, the signal receive end performs polarity reversal on all the data signals. If the phase change indication signal indicates that the signal transmit end has performed polarity reversal on only some of data signals when sending the data signals, the signal receive end performs polarity reversal on the data signals that undergo polarity reversal processing on the signal transmit end, so as to obtain the original real data signals that are not processed.

According to the signal processing method, phase change processing can be performed on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing a volume of coupling crosstalk, generated by the to-be-sent data signals, on the data synchronization signal and further reducing impact of SSN on a system.

The foregoing embodiments disclosed in the present invention describe the methods in detail. The methods in the present invention may be implemented using an apparatus in a plurality of forms. Therefore, the present invention further discloses an apparatus. The following provides detailed description using a specific embodiment.

Figure 5:
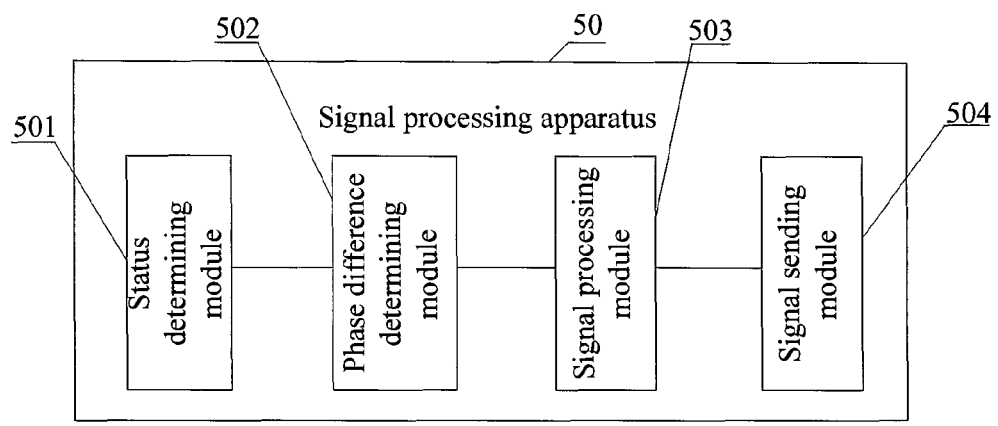
FIG. 5 is a schematic structural diagram of a signal processing apparatus according to an embodiment of the present invention.

FIG. 5 is a schematic structural diagram of a signal processing apparatus according to an embodiment of the present invention. The signal processing apparatus is applied to a signal transmit end and configured to implement the signal processing method shown in FIG. 1 of the present invention. As shown in FIG. 5, the signal processing apparatus 50 may include the following:

A status determining module 501 configured to determine a phase status of a data synchronization signal and phase statuses of N to-be-sent data signals.

N is a positive integer and the to-be-sent data signals may include one or a plurality of to-be-sent data signals. The plurality of to-be-sent data signals is a plurality of to-be-sent data signals that may be simultaneously sent using different transmission paths.

A to-be-sent data signal generates relatively strong interference to a data synchronization signal when a phase of the to-be-sent data signal is opposite or nearly opposite to a phase of the data synchronization signal, especially when a drive current direction of the to-be-sent data signal is opposite to a drive current direction of the data synchronization signal and a drive current value reaches a maximum. Therefore, when the signal transmit end sends to-be-sent data signals, a phase status of a data synchronization signal and phase statuses of the to-be-sent data signals may be first determined. Then, corresponding processing may be performed on a to-be-sent data signal that generates relatively strong interference to the data synchronization signal, so as to achieve a purpose of reducing interference generated by the to-be-sent data signal to the data synchronization signal.

A phase difference determining module 502 configured to determine a phase difference between each to-be-sent data signal and the data synchronization signal.

After the status determining module 501 determines the phase status of the data synchronization signal and the phase statuses of the to-be-sent data signals, if it is found that all to-be-sent data signals currently generate relatively strong interference to the data synchronization signal on the whole, some processing needs to be performed on the to-be-sent data signals, so as to greatly reduce interference of the processed to-be-sent data signals to the data synchronization signal.

It has been described in the method embodiment that, when the to-be-sent data signal and the data synchronization signal have a same phase, the to-be-sent data signal basically does not generate obvious interference to the data synchronization signal; whereas when the phase of the to-be-sent data signal is opposite or nearly opposite to the phase of the data synchronization signal, the to-be-sent data signal generates very strong interference to the data synchronization signal. Therefore, in the embodiment, it may be determined, according to the phase difference between the to-be-sent data signal and the data synchronization signal, whether the phase status of the to-be-sent data signal and the phase status of the data synchronization signal are closer to be same phase or closer to be opposite phases.

A signal processing module 503 configured to perform phase change processing on all or some of the to-be-sent data signals according to a result determined by the phase difference determining module 502.

How to perform phase change on a to-be-sent data signal may be preconfigured according to different user requirements.

A signal sending module 504 configured to send all the to-be-sent data signals and a phase change indication signal to a signal receive end.

Because the signal transmit end has performed related processing on a to-be-sent data signal, a to-be-sent data signal subsequently received by the signal receive end is the to-be-sent data signal processed by the signal transmit end and is not an original to-be-sent data signal. In order not to affect subsequent processing performed by the signal receive end, the signal transmit end needs to send, to the signal receive end, an indication signal indicating phase change processing performed on the to-be-sent data signal, so that the signal receive end learns the processing that the signal transmit end performs on the to-be-sent data signal, and performs subsequent work according to the original to-be-sent data signal that is restored.

In this embodiment, the signal processing apparatus 50 can perform phase change processing on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing interference of the to-be-sent data signals to the data synchronization signal and further decreasing SSN. The apparatus directly performs phase change processing on a to-be-sent data signal according to a phase status of a data synchronization signal and a phase status of the to-be-sent data signal to reduce an amplitude value of SSN from an SSN generating source, so that an effect of decreasing SSN is obvious, without increasing a difficulty of board design and affecting normal transmission of a signal.

In the foregoing embodiment, an action that the signal processing module 503 can execute is different in the case of a different scenario configuration. For example, in one scenario, the signal processing module 503 may be configured to, when the phase difference determining module 502 determines and obtains that phase differences between more than half of the to-be-sent data signals and the data synchronization signal fall within a preset range, perform polarity reversal on all the to-be-sent data signals. However, in another scenario, the signal processing module 503 may be configured to perform polarity reversal on a to-be-sent data signal according to the result determined by the phase difference determining module 502, where a phase difference between the to-be-sent data signal and the data synchronization signal falls within a preset range. In still another scenario, the signal processing module 503 may be configured to, according to a preset algorithm, perform polarity reversal on X to-be-sent data signals in the to-be-sent data signals, where phase differences between the X to-be-sent data signals and the data synchronization signal fall within a preset range, and on Y to-be-sent data signals in the to-be-sent data signals, where phase differences between the Y to-be-sent data signals and the data synchronization signal fall outside the preset range; where X is a positive integer and Y is a natural number.

The preset range may be a phase difference range in a case in which a phase of a to-be-sent data signal is opposite and nearly opposite to a phase of a data synchronization signal.

In a scenario in which a requirement on SSN is not strict, if the phase differences between more than half of the to-be-sent data signals and the data synchronization signal fall within the preset range, it indicates that most to-be-sent data signals in all the to-be-sent data signals generate relatively strong SSN interference, namely SSN, to the data synchronization signal. Therefore, if polarity reversal processing is performed on all the to-be-sent data signals, most to-be-sent data signals in all the processed to-be-sent data signals do not generate obvious interference to the data synchronization signal, thereby decreasing SSN in a system.

In still some cases, the signal transmit end performs polarity reversal processing on a to-be-sent data signal according to a fixed algorithm that is preset. For example, when it is determined that, in all to-be-sent data signals, there are N to-be-sent data signals meeting a condition that phases of the N to-be-sent data signals are opposite to a phase of the data synchronization signal, according to the preset algorithm, it is finally determined that polarity reversal processing is performed on a few to-be-sent data signals in the N to-be-sent data signals, or it is finally determined that polarity reversal processing is performed on a few to-be-sent data signals in the N to-be-sent data signals and a few other to-be-sent data signals (herein, the to-be-sent data signals may have a same phase as the data synchronization signal) excluded in the N to-be-sent data signals. Certainly, regardless of what algorithm is used or regardless of whether phases of to-be-sent data signals on which polarity reversal processing is finally performed are opposite to the phase of the data synchronization signal, it is only required to ensure that a majority of all the to-be-sent data signals do not generate relatively strong interference to the data synchronization signal after phase processing is performed, and a value of interference generated, after phase processing is performed, by all the to-be-sent data signals to the data synchronization signal is less than a value of interference generated, before processing is performed, by all data synchronization signals to the data synchronization signal.

In a scenario in which a requirement on SSN is relatively strict, if phase differences between only a few to-be-sent data signals and the data synchronization signal fall within the preset range, it indicates that only the few to-be-sent data signals in all to-be-sent data signals generate relatively strong interference to the data synchronization signal. Therefore, polarity reversal may be performed specially on the to-be-sent data signals, where the phase differences between the to-be-sent data signals and the data synchronization signal falls within the preset range, so as to decrease SSN in a system.

The signal processing apparatus 50 can perform phase change processing on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing a volume of coupling crosstalk, generated by the to-be-sent data signals, on the data synchronization signal and further reducing impact of SSN on a system.

Figure 6:
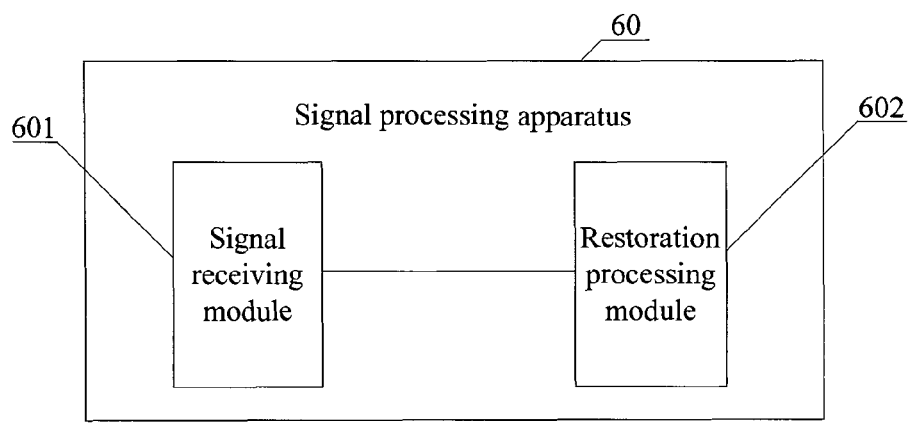
FIG. 6 is a schematic structural diagram of another signal processing apparatus according to an embodiment of the present invention.

FIG. 6 is a schematic structural diagram of another signal processing apparatus according to an embodiment of the present invention. The signal processing apparatus is applied to a signal receive end and configured to implement the signal processing method shown in FIG. 4 of the present invention. As shown in FIG. 6, the signal processing apparatus 60 may include the following:

A signal receiving module 601 is configured to receive a phase change indication signal and data signals that are sent by a signal transmit end.

The phase change indication signal is used for indicating phase change processing that the signal transmit end performs on the data signals. The phase change processing may be phase change processing that the signal transmit end performs on the data signals to decrease SSN in a signal transfer process.

If the signal receive end receives the phase change indication signal sent by the signal transmit end, received data signals is the data signals on which the signal transmit end performs phase change processing.

A restoration processing module 602 is configured to, when the phase change indication signal indicates that the signal transmit end has performed phase change processing on the data signals, perform phase restoration processing on the data signals.

The data signals received by the signal receive end are the data signals that undergoes phase change processing performed by the signal transmit end, and are not original data signals. Therefore, to ensure that subsequent work is performed accurately and smoothly, phase restoration processing needs to be first performed on the received data signals according to the phase change indication signal received from the signal transmit end.

In this embodiment, a signal receive end may receive a phase change indication signal sent by a signal transmit end, where the phase change indication signal may be a signal indicating phase change processing that the signal transmit end performs on a data signal. The phase change processing can be used to decrease SSN generated in a signal transmission process. Therefore, after receiving the data signals sent by the signal transmit end, the signal receive end can restore the data signals into original data signals according to processing that the signal transmit end previously performs on the data signals, that is, performs phase restoration processing on the received data signals. In this way, SSN in a signal transmission process is reduced and the original data signals can be also acquired, without affecting normal work subsequently performed according to the to-be-sent data signal.

In the foregoing embodiment, an action that the restoration processing module 602 can execute in different scenarios. For example, in one scenario, the restoration processing module 602 may be configured to perform polarity reversal on all data signals according to indication information in the phase change indication signal. However, in another scenario, the restoration processing module 602 may be configured to perform, according to indication information in the phase change indication signal, polarity reversal on some of the data signals that undergo polarity reversal processing on the signal transmit end.

It should be noted that the signal receive end performs phase restoration processing on data signals according to phase change indication information that are sent by the signal transmit end and are received by the signal receive end. If the phase change indication information indicates that the signal transmit end has performed polarity reversal on all data signals when sending data signals, the signal receive end performs polarity reversal on all the data signals. If the phase change indication information indicates that the signal transmit end has performed polarity reversal on only some of data signals when sending the data signals, the signal receive end performs polarity reversal on the data signals that undergo polarity reversal processing on the signal transmit end, so as to obtain the original real data signals that are not processed.

The signal processing apparatus 60 can perform phase change processing on to-be-sent data signals according to a phase status of a data synchronization signal and phase statuses of the to-be-sent data signals, so that phase differences between a majority of to-be-sent data signals in the processed to-be-sent data signals and the data synchronization signal meet a certain condition, thereby reducing a volume of coupling crosstalk, generated by the to-be-sent data signals, on the data synchronization signal and further reducing impact of SSN on a system.

Further, the present invention further discloses a signal processing system. The signal processing system includes the signal processing apparatus that is applied to a signal transmit end, as shown in FIG. 5 of the present invention, and the signal processing apparatus that is applied to a signal receive end, as shown in FIG. 6 of the present invention.

The signal processing system is configured to perform phase change processing on to-be-sent data signals according to a phase status of a data synchronization signal and phase statuses of the to-be-sent data signals, so that phase differences between a majority of to-be-sent data signals in processed to-be-sent data signals and the data synchronization signal meet a certain condition, thereby reducing interference of the to-be-sent data signals to the data synchronization signal and further decreasing SSN. In the system, phase change processing is directly performed on a to-be-sent data signal according to a phase status of a data synchronization signal and a phase status of the to-be-sent data signal to reduce an amplitude value of SSN from an SSN generating source, so that an effect of decreasing SSN is obvious, without increasing a difficulty of board design and affecting normal transmission of a signal.

Figure 7:
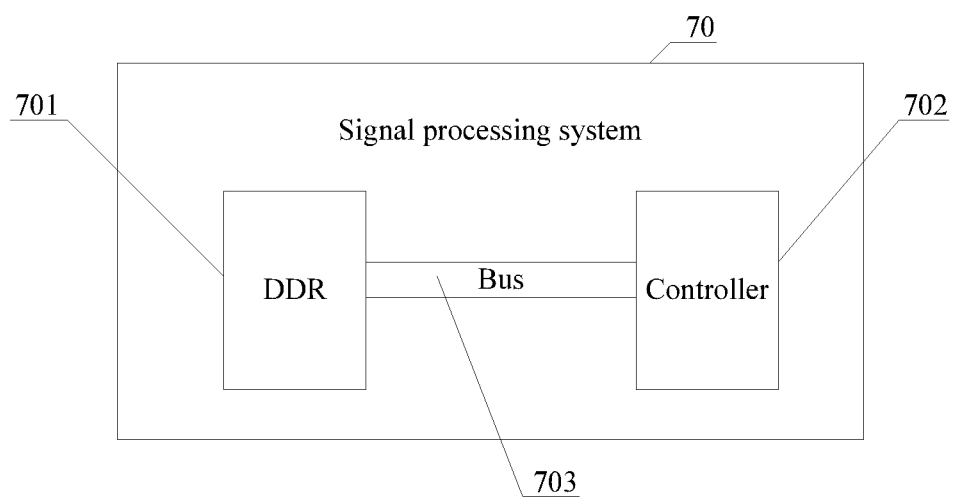
FIG. 7 is a schematic structural diagram of a signal processing system according to an embodiment of the present invention.

The signal processing apparatus that is applied to a signal transmit end may be disposed in a DDR and is implemented using a DDR bus controller; and correspondingly, the signal processing apparatus that is applied to a signal receive end may also be disposed in a controller. Alternatively, the signal processing apparatus that is applied to a signal transmit end may be disposed in a controller; and correspondingly, the signal processing apparatus that is applied to a signal receive end may be disposed in a DDR and is implemented using a DDR bus controller. Generally, when a DDR is a signal transmit end, a signal receive end is a controller; and when a controller is a signal transmit end, a signal receive end is a DDR. As shown in FIG. 7, the signal processing system 70 includes a DDR 701 and a controller 702. The DDR 701 and the controller 702 are connected using a bus 703.

The controller 702 may be a universal processor, including a central processing unit (CPU), a network processor (NP), and the like; or may be a digital signal processor (DSP), an application specific integrated circuit (ASIC), a field-programmable gate array (FPGA), another programmable logic device, or the like. Any device that provides a signal processing function and has a DDR bus interface may be the controller in this embodiment of this application.

The apparatuses disclosed in the embodiments of this specification correspond to the methods disclosed in the embodiments. For related content, refer to descriptions in the method embodiment.

In combination with the embodiments disclosed in this specification, method or algorithm steps may be implemented directly by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a compact disk ROM (CD-ROM), or a storage medium in any other forms well-known in the art.

The preceding description disclosed in the embodiments allows a person skilled in the art to implement or use the present invention. Various modifications to the embodiments are obvious to the professional person skilled in the art, and general principles defined in this specification may be implemented in other embodiments without departing from the scope of the present invention. Therefore, the present invention will not be limited to the embodiments described in this specification but extends to the widest scope that complies with the principles disclosed in this specification.

What is claimed is:

1. In a signal transmit end, a signal processing method, comprising:
   determining a phase status of a data synchronization signal and phase statuses of N to-be-sent data signals, wherein N is a positive integer;
   determining a phase difference between each to-be-sent data signal and the data synchronization signal;
   performing phase change processing on at least some of the to-be-sent data signals according to a result of the determining; and
   sending all the to-be-sent data signals and a phase change indication signal to a signal receive end, wherein the phase change indication signal indicates that the signal transmit end has performed phase change processing on at least some of the to-be-sent data signals.

2. The signal processing method according to claim 1, wherein performing the phase change processing on at least some of the to-be-sent data signals according to the result of the determining comprises performing polarity reversal on all the to-be-sent data signals when the phase differences between more than half of the to-be-sent data signals and the data synchronization signal fall within a preset range.

3. The signal processing method according to claim 1, wherein performing the phase change processing on at least some of the to-be-sent data signals according to the result of the determining comprises performing polarity reversal on the to-be-sent data signal, wherein the phase difference between the to-be-sent data signal and the data synchronization signal falls within a preset range.

4. The signal processing method according to claim 1, wherein performing the phase change processing on at least some of the to-be-sent data signals according to the result of the determining comprises:
   performing, according to a preset algorithm, polarity reversal on X to-be-sent data signals in the to-be-sent data signals, wherein the phase differences between the X to-be-sent data signals and the data synchronization signal fall within a preset range; and
   performing, according to the preset algorithm, polarity reversal on Y to-be-sent data signals in the to-be-sent data signals, wherein the phase differences between the Y to-be-sent data signals and the data synchronization signal fall outside the preset range, and wherein X is a positive integer and Y is a natural number.

5. The signal processing method according to claim 1 further comprising adding configuration information in a configuration register of the signal transmit end, wherein the configuration information is used for indicating whether the signal transmit end enables processing the to-be-sent data signal.

6. The signal processing method according to claim 1 further comprising transferring the phase change indication signal using a signal indication line added between the signal transmit end and the signal receive end.

7. A signal processing apparatus, which is applied to a signal transmit end, comprising:
   a status determining module configured to determine a phase status of a data synchronization signal and phase statuses of N to-be-sent data signals, wherein N is a positive integer;
   a phase difference determining module configured to determine a phase difference between each to-be-sent data signal and the data synchronization signal;
   a signal processing module configured to perform phase change processing on at least some of the to-be-sent data signals according to a result determined by the phase difference determining module; and
   a signal sending module configured to send all the to-be-sent data signals and a phase change indication signal to a signal receive end, wherein the phase change indication signal indicates that the signal transmit end has performed phase change processing on at least some of the to-be-sent data signals.

8. The signal processing apparatus according to claim 7, wherein the signal processing module is further configured to perform polarity reversal on all the to-be-sent data signals when the phase difference determining module determines that the phase differences between more than half of the to-be-sent data signals and the data synchronization signal fall within a preset range.

9. The signal processing apparatus according to claim 7, wherein the signal processing module is further configured to perform polarity reversal on the to-be-sent data signal according to the result of the determining of the phase difference determining module, wherein the phase difference between the to-be-sent data signal and the data synchronization signal falls within a preset range.

10. The signal processing apparatus according to claim 7, wherein the signal processing module is further configured to:
    perform, according to a preset algorithm, polarity reversal on X to-be-sent data signals in the to-be-sent data signals, wherein the phase differences between the X to-be-sent data signals and the data synchronization signal fall within a preset range; and
    perform, according to a preset algorithm, polarity reversal on Y to-be-sent data signals in the to-be-sent data signals, wherein the phase differences between the Y to-be-sent data signals and the data synchronization signal fall outside the preset range, wherein X is a positive integer and Y is a natural number.

11. The signal processing apparatus according to claim 7, wherein the signal processing apparatus is configured to add configuration information in a configuration register of the signal transmit end, wherein the configuration information is used for indicating whether the signal transmit end enables processing the to-be-sent data signal.

12. The signal processing apparatus according to claim 7, wherein the signal sending module is further configured to transfer the phase change indication signal, using a signal indication line added between the signal transmit end and the signal receive end.

13. The signal processing method according to claim 1 further comprising transferring the phase change indication signal by reusing an original signal line between the signal transmit end and the signal receive end.

14. The signal processing method according to claim 8, wherein the signal sending module is further configured to transfer the phase change indication signal by reusing an original signal line between the signal transmit end and the signal receive end.

15. A signal processing system, comprising:
    a signal transmit end configured to:
    determine a phase status of a data synchronization signal and phase statuses of N to-be-sent data signals, wherein N is a positive integer;
    determine a phase difference between each to-be-sent data signal and the data synchronization signal;
    perform phase change processing on at least some of the to-be-sent data signals according to a result of the determining; and
    send all the to-be-sent data signals and a phase change indication signal to a signal receive end, wherein the phase change indication signal indicates that the signal transmit end has performed phase change processing on at least some of the to-be-sent data signals.

16. The signal processing system of claim 15, wherein the signal receive end is configured to:
    receive the phase change indication signal and the data signals that are sent by the signal transmit end; and
    perform phase restoration processing on the data signals when the phase change indication signal indicates that the signal transmit end has performed phase change processing on at least some of the data signals.

17. A signal processing apparatus, comprising:
    a signal transmit end configured to:
    determine a phase status of a data synchronization signal and phase statuses of N to-be-sent data signals, wherein N is a positive integer;
    determine a phase difference between each to-be-sent data signal and the data synchronization signal;
    perform phase change processing on at least some of the to-be-sent data signals according to a result of the determining; and
    send all the to-be-sent data signals and a phase change indication signal to a signal receive end, wherein the phase change indication signal indicates that the signal transmit end has performed phase change processing on at least some of the to-be-sent data signals.

18. The signal processing apparatus of claim 17, wherein the signal receive end is configured to:
    receive the phase change indication signal and the data signals that are sent by the signal transmit end; and
    perform phase restoration processing on the data signals when the phase change indication signal indicates that the signal transmit end has performed phase change processing on at least some of the data signals.

* * * * *

UNITED STATES PATENT AND TRADEMARK OFFICE
CERTIFICATE OF CORRECTION

PATENT NO. : 9,172,527 B2  
APPLICATION NO. : 14/562231  
DATED : October 27, 2015  
INVENTOR(S) : Tian Tang, Shengua Niu and Lebin Tang Page 1 of 1

It is certified that error appears in the above-identified patent and that said Letters Patent is hereby corrected as shown below:

On The Title Page, Item 30, Foreign Application Data Section should read:

Dec. 12, 2013  (CN) ........................... 201310684694.0

Signed and Sealed this
Twenty-second Day of March, 2016

Michelle K. Lee
*Director of the United States Patent and Trademark Office*